United States Patent
Hellerstein et al.

(10) Patent No.: US 6,697,791 B2
(45) Date of Patent: Feb. 24, 2004

(54) SYSTEM AND METHOD FOR SYSTEMATIC CONSTRUCTION OF CORRELATION RULES FOR EVENT MANAGEMENT

(75) Inventors: Joseph L. Hellerstein, Ossining, NY (US); Sheng Ma, Briarcliff Manor, NY (US); Luanne M. Burns, Virginia Beach, VA (US); Chang-shing Perng, Bedford Hills, NY (US); David A. Rabenhorst, Woodcliff Lake, NJ (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 09/849,565

(22) Filed: May 4, 2001

(65) Prior Publication Data

US 2002/0165842 A1 Nov. 7, 2002

(51) Int. Cl.$^7$ .............................................. G06F 17/00
(52) U.S. Cl. ...................................................... 706/47
(58) Field of Search ........................................... 706/47

(56) References Cited

U.S. PATENT DOCUMENTS

| | | | |
|---|---|---|---|
| 5,661,668 A | 8/1997 | Yemini et al. | 702/186 |
| 5,874,955 A | 2/1999 | Rogowitz et al. | 345/589 |
| 2002/0073195 A1 | 6/2002 | Hellerstein et al. | 709/224 |

OTHER PUBLICATIONS

1. W. Mueller et al., "A Visual Framework for the Scripting of Parallel Agents," IEEE International Symposium on Visual Languages, Seattle, WA, pp. 77–78, Sep. 2000.
2. D. Thoenen et al., "Event Relationship Networks: A Framework for Action Oriented Analysis in Event Management," IBM Search Report RC 21843 (98313), pp. 1–16, Sep. 2000.
3. D.M. Thompson et al., "An Examination of the Potential Role of the Internet in Distributed SPC and Quality Systems," Quality and Reliability Engineering International, vol. 16, No. 1, John Wiley & Sons, Ltd., pp. 51–57, 2000.
4. Neugents ii —Software That Can Think, Computer Associates, 2 pages, 1999.
5. T.M. Mitchell, "Machine Learning," Chapter 2, "Concept Learning and the General–to–Specific Ordering," McGraw–Hill, pp. 29–33, 1997.
6. K.R. Milliken et al., "YES/MVS and the Automation of Operations for Large Computer Complexes," IBM Systems Journal, vol. 25, No. 2, pp. 159–180, 1986.

*Primary Examiner*—George B. Davis
(74) *Attorney, Agent, or Firm*—Gail H. Zarick; Ryan, Mason & Lewis, LLP

(57) ABSTRACT

A technique is provided for systematically constructing one or more correlation rules for use by an event management system for managing a network with one or more computing devices. The technique comprises the following steps. First, in association with an event cache, event data representing past or historical events associated with the network of computing devices being managed by the event management system is obtained. Next, a first pattern is found or detected in the obtained event data associated with the event cache. The pattern is then classified. Then, at least one correlation rule is constructed based on the classified pattern. Lastly, in association with the event cache, the one or more events included in the pattern are replaced with a composite or cumulative event such that hierarchical patterns may be subsequently found for use in constructing further correlation rules.

20 Claims, 6 Drawing Sheets

SYSTEM AND METHOD FOR SYSTEMATIC CONSTRUCTION OF CORRELATION RULES FOR EVENT MANAGEMENT

CROSS REFERENCE TO RELATED APPLICATIONS

The present application is related to the U.S. patent application identified as Ser. No. 09/731,937, filed on Dec. 7, 2000 and entitled: "Method and System for Machine-Aided Rule Construction for Event Management," the disclosure of which is incorporated by reference herein.

FIELD OF THE INVENTION

The present invention relates generally to network and systems management and, more particularly, to techniques for generating correlation rules for use in detecting and resolving availability and performance problems.

BACKGROUND OF THE INVENTION

With the dramatic decline in the price of hardware and software, the cost of ownership for computing devices is increasingly dominated by network and systems management. Included here are tasks such as establishing configurations, help desk support, distributing software, and ensuring the availability and performance of vital services. The latter is particularly important since inaccessible and/or slow services decrease revenues and degrade productivity.

The first step in managing availability and performance is event management. Almost all computing devices have a capability whereby the onset of an exceptional condition results in the generation of a message so that potential problems are detected before they lead to widespread service degradation. Such exceptional conditions are referred to as "events." Examples of events include: unreachable destinations, excessive central processing unit (CPU) consumption, and duplicate Internet Protocol (IP) addresses. An event message contains multiple attributes, for example: (a) the source of the event; (b) type of event; and (c) the time at which the event was generated.

Event messages are sent to an "event management system (EMS)." An EMS has an "adaptor" that parses the event message and translates it into a normalized form. This normalized information is then placed into an "event database." Next, the normalized event is fed into a "correlation engine" that determines actions to be taken. This determination is typically driven by correlation rules that are kept in a "rule database." Examples of processing done by correlation rules includes:

1. Elimination of duplicate messages. "Duplicate" is interpreted broadly here. For example, if multiple hosts on the same local area network generate a destination-unreachable message for the same destination, then the events contain the same information.

2. Maintenance of operational state. "State" may be as simple as which devices are up (e.g., operating) and which are down (e.g., not operating). It may be more complex as well, especially for devices that have many intermediate states or special kinds of error conditions (e.g., printers).

3. Problem detection. A problem is present if one or more components of the system are not functioning properly. For example, the controller in a load balancing system may fail in a way so that new requests are always routed to the same back-end web server, a situation that can be tolerated at low loads but can lead to service degradation at a high load. Providing early detection of such situations is important in order to ensure that problems do not lead to widespread service disruptions.

4. Problem isolation. This involves determining the components that are causing the problem. For example, distributing a new release of an application that has software errors can result in problems for all end-users connecting to servers with the updated application. Other examples of causes of problems include: device failure, exceeding some internal limit (e.g., buffer capacity), and excessive resource demands.

The correlation engine provides automation that is essential for delivering cost effective management of complex computing environments. Existing art provides three kinds of correlation. The first employs operational policies expressed as rules, see, e.g., K. R. Milliken et al., "YES/MVS and the Automation of Operations for Large Computer Complexes," IBM Systems Journal, vol. 25, no. 2, 1986. Rules are if-then statements in which the if-part tests the values of attributes of individual events, and the then-part specifies actions to take. An example of such a rule is: "If a hub generates an excessive number of interface-down events, then check if the software loaded on the hub is compatible with its hardware release." The industry experience has been that such rules are difficult to construct, especially if they include installation-specific information.

Another approach has been developed by SMARTS (Systems Management Arts) based on the concept of a code book that matches a repertoire of known problems with event sequences observed during operation. This is described in U.S. Pat. No. 5,661,668 issued to Yemini et al. on Aug. 26, 1997 and entitled "Apparatus and Method for Analyzing and Correlating Events in a System Using a Causality Matrix." Here, operational policies are models of problems and symptoms. Thus, accommodating new problems requires properly modeling their symptoms and incorporating their signatures into a code book. In theory, this approach can accommodate installation-specific problems. However, doing so in practice is difficult because of the high level of sophistication required to encode installation-specific knowledge into rules.

Recently, a third approach to event correlation has been proposed by Computer Associates International called "Neugents." This approach trains a neural network to predict future occurrences of events based on factors characterizing their occurrence in historical data. Typically, events are specified based on thresholds, such as CPU utilization exceeding 90%. The policy execution system uses the neural network to determine the likelihood of one of the previously specified events occurring at some time in the future. While this technique can provide advanced knowledge of the occurrence of an event, it still requires specifying the events themselves. At a minimum, such a specification requires detailing the following:

1. The variable measured (e.g., CPU utilization);
2. The directional change considered (e.g., too large); and
3. The threshold value (e.g., 90%).

The last item can be obtained automatically from examining representative historical data. Further, graphical user interfaces can provide a mechanism to input the information in items (2) and (3). However, it is often very difficult for installations to choose which variables should be measured and the directional change that constitutes an exceptional situation.

To summarize, the above-described existing art for event management systems is of three types. The first type (e.g., as in the K. R. Milliken et al. article, 1986) requires that correlation rules be specified by experts, a process that is time-consuming and expensive. The second type (e.g., as in the Yemini et al. patent) reduces the involvement of experts but only for aspects of event management that share broad commonalties (e.g., IP connectivity). The third type (e.g., Computer Associates International's Neugent software, 1999) attempts to automate the construction of correlation rules for a broader range of management areas. However, to date, this has not been done in a manner that provides for customization by experts, especially in a way that avoids dealing with low-level details (e.g., specific threshold values, the choice of measurement values, and directional changes of interest for these variables).

Other work relating to the construction of correlation rules includes: (a) statistical process control, which provides for a way to set baseline levels of continuously operating machines, e.g., D. M. Thompson et al., "Examination of the Potential Role of the Internet in Distributed SPC and Quality Systems," Quality and Reliability Engineering International, vol. 16, no. 1, 2000; (b) visual programming for rule-base systems, which overcomes some of the syntactic problems of rule construction, e.g., W. Mueller et al., "A Visual Framework for the Scripting of Parallel Agents," IEEE International Symposium on Visual Languages," Seattle, Wash., September 2000; and (c) event management design, which provides a process driven by human experts to construct correlation rules, e.g., D. Thoenen et al., "Event Relationship Networks: A Framework for Action Oriented Analysis in Event Management," IBM Research Report RC 21843, October 2000.

SUMMARY OF THE INVENTION

The present invention addresses the problem of decision support for constructing correlation rules for event management. More specifically, the invention provides techniques for systematically processing historical event data in accordance with an event cache to extract correlation rules.

In one aspect of the invention, a technique for systematically constructing one or more correlation rules for use by an event management system for managing a network with one or more computing devices comprises the following steps. First, in association with an event cache, event data representing past events associated with the network of computing devices being managed by the event management system is obtained. For example, this may involve reading the past or historical event data from an event repository into the event cache, or having the event cache simply point to the event data in the event repository. Next, a first pattern is found or detected in the obtained event data associated with the event cache. The pattern therefore includes one or more events in the obtained event data. The pattern is then classified. For example, the pattern may be classified as normal or abnormal. Then, at least one correlation rule is constructed based on the classified pattern. Lastly, in association with the event cache, the one or more events included in the pattern are replaced with a composite or cumulative event such that hierarchical patterns may be subsequently found for use in constructing further correlation rules. The composite event represents the individual events comprising the pattern. The constructed correlation rule may then be stored in a rule database for access by the event management system.

In one illustrative embodiment, the correlation rule constructing step may comprise the steps of automatically learning at least one predicate of the correlation rule from the pattern found, and then adding at least one corresponding action to the automatically learned predicate, based on the classifying step, to form the correlation rule. This automatic learning process may also utilize positive examples and negative examples of the one or more events included in a detected and classified pattern.

Further, the step of finding a pattern in the event data of the event cache may comprise a user marking the event pattern in accordance with a data visualization of at least a portion of the event data associated with the event cache. In another embodiment, the step may comprise employing a data mining algorithm.

Advantageously, the steps of finding the pattern, classifying the pattern, constructing the rule and replacing the events in the pattern with a composite event may be repeated until all the event data associated with the event cache is considered. In this manner, the past or historical data in the event cache is systematically processed such that a more comprehensive set of correlation rules can be constructed. Such inventive techniques have several advantages. First, for example, rules are constructed for patterns that actually exist. Second, for example, situations that experts may be unaware of are discovered since patterns in historical data are revealed in a systematic way.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described below in the context of an exemplary event management system architecture. However, it is to be understood that the invention is not limited to use with any particular event management system architecture but is rather more generally applicable for use in accordance with any event management systems in which it is desirable to provide decision support for constructing correlation rules.

Figure 1:
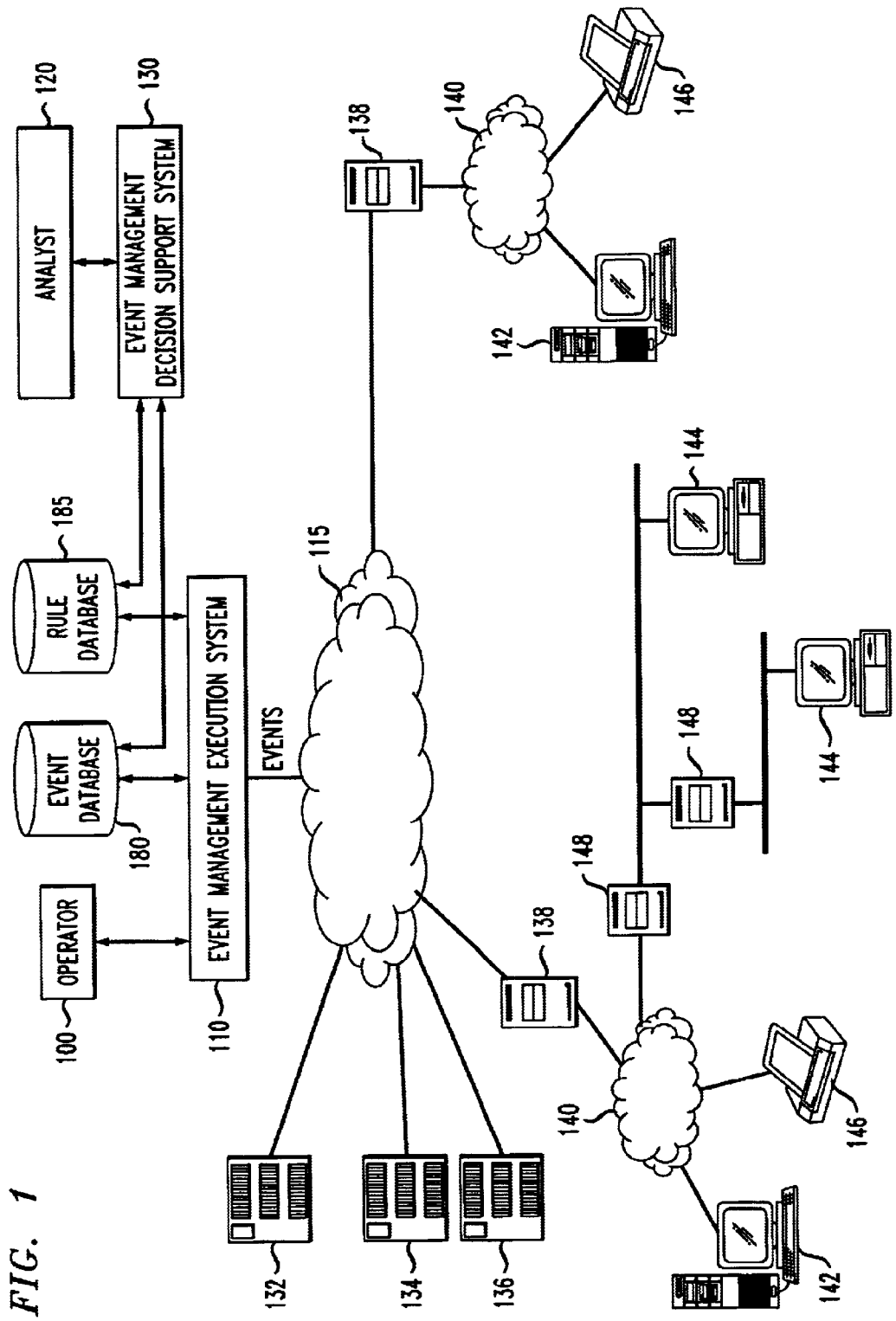
FIG. 1 is a block diagram illustrating an overall architecture in which a systematic rule construction system for event management according to an embodiment of the present invention may operate.

Referring initially to FIG. 1, a block diagram illustrates an overall architecture in which a systematic rule construction system for event management according to an embodiment of the present invention may operate. Generally, FIG. 1 shows an event management decision support system according to the invention operating in association with an event management execution system in the context of an exemplary network of distributed computing devices with which the present invention may be employed. It is to be appreciated that the event management decision support system is the systematic rule construction system of the invention.

Thus, as depicted in FIG. 1, an operator 100 receives alerts and initiates responding actions based on interactions with an event management execution system 110. The event management execution system 110 receives events generated by computing devices of various types. The computing devices are connected to the event management execution system 110 via a network 115. The network 115 may be, for example, a public network (e.g., Internet), a private network, and/or some other suitable network. The computing devices may include, for example, file servers 132, name servers 134, mail servers 136, routers 138, wherein the routers provide connection to the network 115 for work stations 142 and 144, print servers 146 and hub 148 through subnetworks 140.

The event management execution system 110 updates the event database (Event DB) 180 with newly received events and reads this database to do event correlation based on a rule database (Rule DB) 185. An analyst 120 uses an event management decision support system 130 of the present invention to develop the correlation rules used by the event management execution system 110 to control the interactions with the operator 100. Doing so requires reading historical event data in the Event DB and writing to the Rule DB. Detailed explanations of the components of the event management decision support system 130 of the present invention will be provided below.

It is to be understood that the operator 100 and the analyst 120 are individuals who may directly interact with the event management execution system 110 and the event management decision support system 130, respectively, in association with the computer system(s) upon which the event management execution system 110 and the event management decision support system 130 reside and execute, or they may have their own dedicated computer systems that are in communication with the event management execution system 110 and the event management decision support system 130, respectively. It is also to be understood that the event management execution system 110, the event management decision support system 130, the event database 180 and the rule database 185 may cumulatively be referred to as an event management system or EMS.

Figure 2:
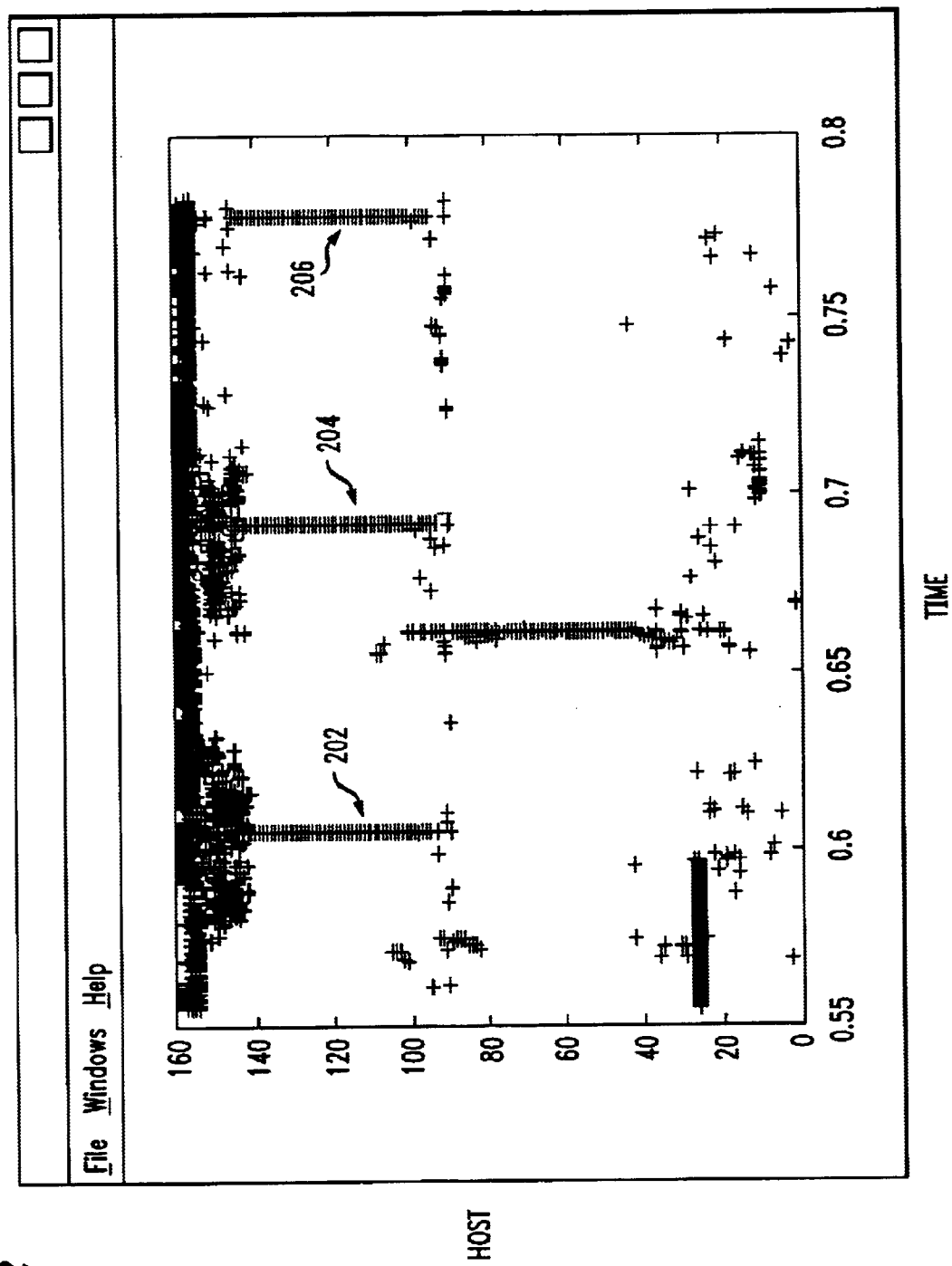
FIG. 2 is a diagram displaying a visualization used to identify groupings of events when systematically constructing rules according to an embodiment of the present invention.

Referring now to FIG. 2, a diagram illustrates an example of a visualization or display used by the event management decision support system 130 (FIG. 1) to aid analysts 120 (FIG. 1) in constructing correlation rules. The figure illustrates a scatter plot in which the x-axis is time (e.g., a timescale of 2.5 days) and the y-axis is a numerically encoded identifier uniquely representing the respective computing devices in the network (hosts) from which events emanate. Each mark (+) in the graph denotes an event that occurred at a specific time and originated from a specific host. Groupings, or patterns, of events are often suggestive of situations for which correlation rules are needed. For example, the three evenly spaced vertical lines (denoted as 202, 204 and 206 in FIG. 2) may comprise events that occurred everyday at 2:00 pm as a result of an incorrectly configured monitoring program.

While any suitable data visualization methodology may be employed to produce a visualization of event data for use by the invention, the display in FIG. 2 is produced by a preferred visualization methodology which is described in the U.S. patent application identified by Ser. No. 09/359,874 filed on Jul. 27, 1999 and entitled "System and Method for Exploratory Analysis of Data for Event Management," and in S. Ma et al., "EventBrowser: A Flexible Tool for Scalable Analysis of Event Data," Distributed Operations and Management, 1999, the disclosures of which are incorporated by reference herein. One of ordinary skill in the art will realize various other methods for providing event data visualizations that may be employed in accordance with the present invention, e.g., the visualization methodologies described in U.S. Pat. No. 5,874,955 issued to Rogowitz et al. on Feb. 23, 1999 and entitled "Interactive Rule Based System with Selection Feedback that Parameterizes Rules to Constrain Choices for Multiple Operations," the disclosure of which is incorporated by reference herein.

Figure 3:
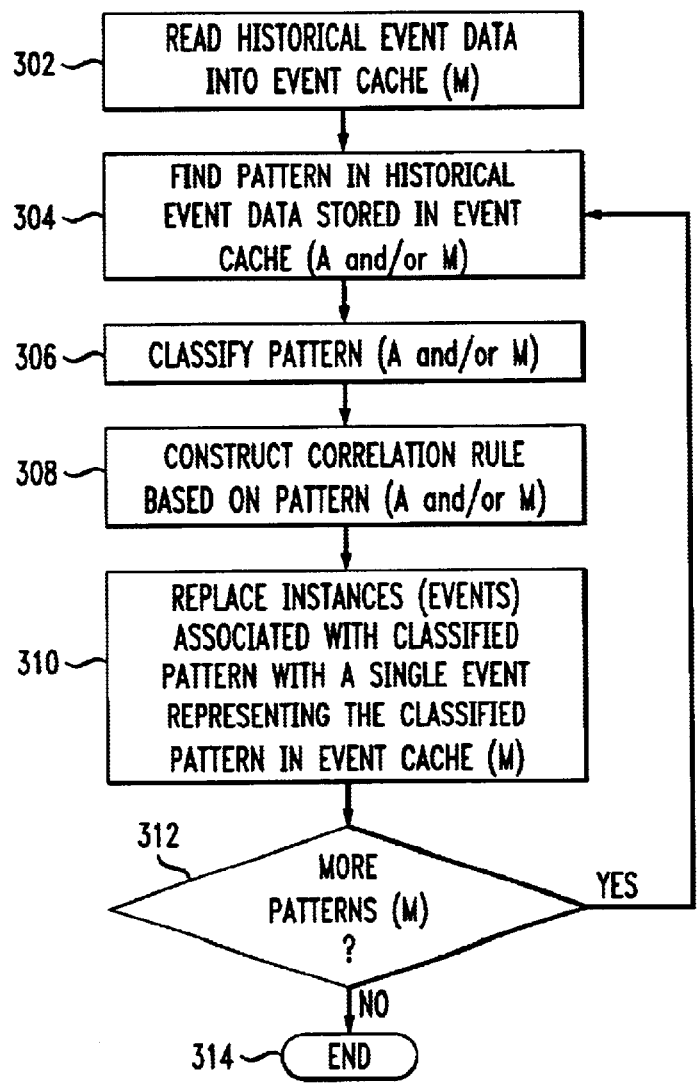
FIG. 3 is a flow diagram illustrating a systematic rule construction methodology according to an embodiment of the present invention.

Referring now to FIG. 3, a flow diagram illustrates a systematic rule construction methodology according to an embodiment of the present invention. It is to be appreciated that the methodology depicted in FIG. 3 may be carried out by the analyst 120 (FIG. 1) and the event management decision support system 130 (FIG. 1). Steps in FIG. 3 denoted with the letter "A" may preferably be performed by an analyst (human); those that are denoted with the letter "M" may preferably be performed by the machine (event management decision support system); and those denoted with "A and/or M" are preferably done either collaboratively by the analyst and the machine, or by the analyst or machine alone. Thus, as is evident, the entire methodology may be automated, i.e., performed in accordance with the machine. However, the present invention realizes that much benefit may be derived by providing appropriate decision support tools (all or portions of the event management decision support system) to human experts (analysts) to systematically extract correlation rules from historical data. Thus, as will be evident from the description below, certain steps of the rule construction methodology of the invention are preferably performed by the analyst in conjunction with the machine or event management decision support system.

In step 302, the event management decision support system reads previously accumulated event data into an event cache. The previously accumulated data is stored in memory associated with the event management decision support system, e.g., Event DB 180 in FIG. 1, prior to being read into the event cache. The previously accumulated event data represents historical event data. It is to be understood that the term "historical," as used herein, refers to event data that was generated by network devices and received by the event management system at some prior time. The time period from which the data is drawn may depend on the event management application. Thus, for example, the event data may be data generated and received between a point in time in the immediate past and some earlier relative point in time. Therefore, the historical event data accumulated over the desired time period is read from the Event DB into the event cache of the event management decision support system. It is this event data that is used to generate the one or more correlation rules.

Next, in step 304, a first pattern in the event data contained in the event cache is detected. As mentioned above, this may be accomplished by: (1) the analyst reviewing one or more visualizations of the subject event data, visually determining a pattern and then selecting (highlighting, rubberbanding, etc.) the pattern; or (2) more preferably, by the event management decision support system using one or more well-known data mining algorithms, e.g., as described in the above-referenced U.S. patent application identified by Ser. No. 09/359,874 filed on Jul. 27, 1999 and entitled "System and Method for Exploratory Analysis of Data for Event Management." Of course, other suitable mining techniques may be employed. Thus, for example, the analyst may input particular data mining criteria to the algorithm, which may include a query associated with the event type(s) that is being sought. The algorithm then mines the event database and selects the event groupings that satisfy the query.

By way of example with reference back to the scatter plot of FIG. 2, a first pattern may include the events in the three evenly spaced vertical lines denoted as 202, 204 and 206 in FIG. 2. Each such event is therefore considered an instance of the pattern.

In step 306, the analyst, based on his or her experience, classifies the pattern. Again, the event management decision support system may alternatively be configured to automatically classify the pattern. While many pattern classifications may be used, two basic classifications that are preferably used are: (i) "normal" pattern; and (ii) "abnormal" pattern. A normal pattern classification means that the events in the pattern are supposed to happen and, therefore, should be ignored or filtered, i.e., no corrective action need be taken. An abnormal classification means that the events in the pattern are not supposed to happen and therefore intervention and/or investigation is required, i.e., some corrective action needs to be taken.

In step 308, a correlation rule is constructed based on the classified pattern. Preferably, the correlation rule is constructed using the methodologies described in the above-referenced U.S. patent application identified as Ser. No. 09/731,937, filed on Dec. 7, 2000 and entitled: "Method and System for Machine-Aided Rule Construction for Event Management." In such case, the construction process preferably involves both the analyst and the event management decision support system. An illustrative embodiment of the rule construction process will be described below in the context of FIGS. 4 and 5.

Once the rule for the particular detected and classified pattern is constructed, the event management decision support system replaces, in the event cache, the events or instances corresponding to the pattern with a single event compositely or cumulatively representing the individual events or instances of the pattern. At this point, the updated event cache contains the remaining individual events not associated with the first pattern, as well as the composite event.

Advantageously, when searching for the next pattern (i.e., returning to step 304), the process may consider the composite event as an event that may be grouped into another pattern. For example, assume that three events, denoted for the sake of explanation as A, B and C, are considered to indicate a pattern. After a correlation rule is generated for that pattern, according to the invention, events A, B and C are replaced in the event cache with a single composite event, denoted as D. Then, in a subsequent iteration of the process, composite event D may be grouped with individual events E and F as a detected pattern DEF. After a rule is generated, the instances of pattern DEF are then replaced with a composite event, denoted as G.

Accordingly, in this manner, a technique is provided in accordance with the invention by which all the data in the event cache is systematically processed, and by which hierarchical patterns, e.g., patterns having different levels of events (patterns within patterns), may be identified and used to construct correlation rules for event management purposes.

In step 312, the event management decision support system determines whether another pattern exists in the data in the updated event cache. If no, i.e., it is assumed that all events in the event cache have been considered and all patterns detected, the process ends at block 314. If more data needs to be considered and therefore more patterns may exist, the process returns to step 304 to detect the next pattern and then generate one or more corresponding correlation rules.

The overall process is repeated until all events in the event cache are considered. All constructed rules are stored in the rule database (Rule DB 185 in FIG. 1) for use by the event management execution system 110 during real-time operations.

Figure 4:
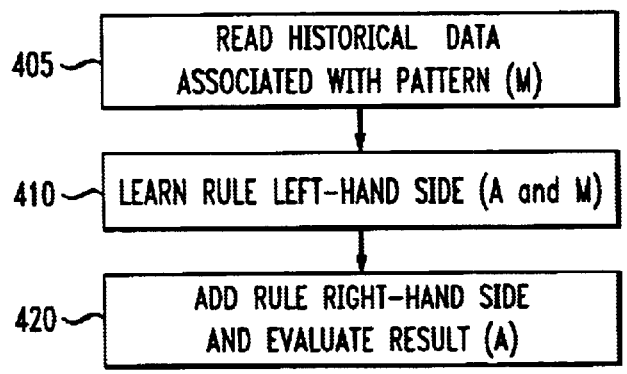
FIG. 4 is a flow diagram illustrating a construction methodology for use in accordance with an embodiment of the present invention.
Figure 5:
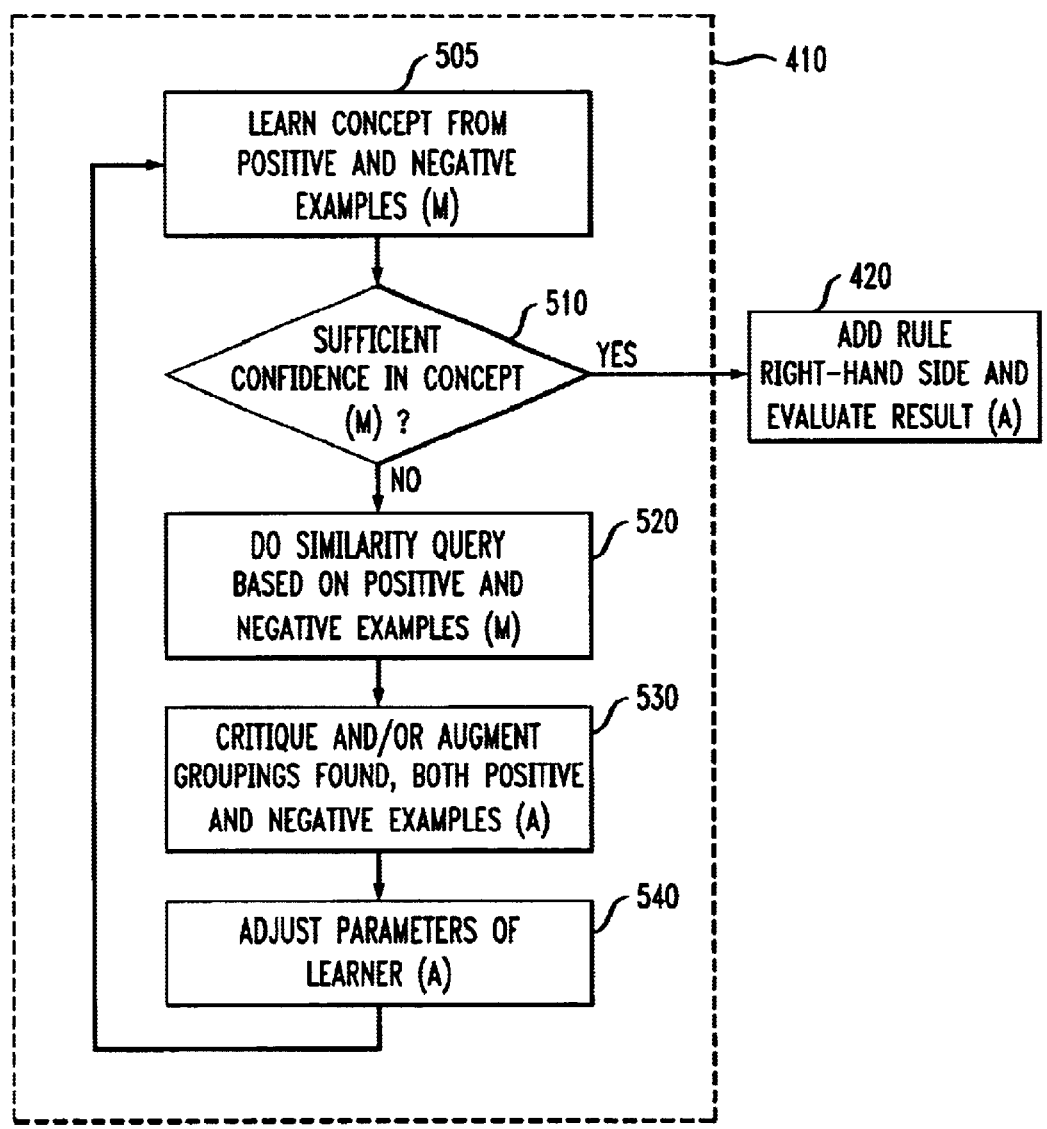
FIG. 5 is a flow diagram illustrating a process for query-based learning of a rule left-hand side for use in accordance with an embodiment of the present invention.

Referring now to FIGS. 4 and 5, respective flow diagrams show an illustrative methodology for constructing a correlation rule from a detected pattern in accordance with an analyst and the event management decision support system. It is to be understood that the techniques described in FIGS. 4 and 5 may be employed as step 308 in the overall inventive process shown in FIG. 3. However, other suitable rule construction techniques may be employed.

FIG. 4 illustrates a general overview of the process, while FIG. 5 illustrates details of a rule left-hand side learning step. By a rule left-hand side (LHS), we refer to the condition or predicate portion of a rule. Learning a left-hand side means determining the predicates necessary to describe a set of event groupings or patterns. Predicates comprise logical statements about attribute values. For example, in an IP (Internet Protocol) network, it may be that event groups are characterized originating from hubs, on subnet 9.2.16, with an event rate of 0.5 per second. Thus, this illustrative technique utilizes a learning algorithm to determine these predicates. By contrast, the right-hand side (RHS) of a rule specifies the action to be taken dependent on the results of an evaluation of the condition or predicate on the left-hand side.

This illustrative technique realizes that machine learning algorithms may be used to describe patterns in terms of rules. A preferred framework adopted for use may be learning concepts expressed as predicates on attributes, see, e.g., T. M. Mitchell, "Machine Learning," McGraw Hill, 1997, the disclosure of which is incorporated herein by reference. In essence, a concept is a where-clause as expressed in the structured query language (SQL). An example is: "All events originate from subnet 15.2.3 and the event rate exceeds 0.75 per second." Here, the attribute subnet must have the value 15.2.3 and the total number of events divided by the time-span in seconds of the group must exceed 0.75.

Referring now to FIG. 4, the event management decision support system reads the historical event data associated with the detected pattern from the event cache in step 405. In step 410, the analyst and the event management decision support system collaborate to learn the left-hand side (LHS) of the correlation rule based on the detected pattern. This operation will be explained in detail below in the context of FIG. 5. In step 420, the analyst augments the left-hand side with a right-hand side (RHS) action. The RHS action is based on the classification done in step 306 of FIG. 3, e.g., filter or ignore events if normal pattern; alert operator and/or initiate remedial action if abnormal pattern. The resulting rule is then evaluated. This may include applying the rule's left-hand side to historical event data, and selecting instances of the pattern specified by the rule. By so doing, the operations staff can determine if the situations for which the rule is intended are in fact those that will be selected in production.

Referring now to FIG. 5, a flow diagram illustrates a process for query-based learning of a rule left-hand side. Specifically, FIG. 5 provides the details of step 410 in FIG. 4. As previously mentioned, the illustrative technique makes use of a machine learning algorithm to describe a pattern in terms of a rule. A preferred framework adopted for use with the invention is the learning concepts framework described in the above-referenced T. M. Mitchell, "Machine Learning," McGraw Hill, 1997.

As mentioned, the learning concepts framework expresses predicates on attributes, and a concept is basically a where-clause as expressed in the structured query language (SQL). In order to facilitate the learning concepts, one or more abstraction hierarchies are used. In event management of a network of distributed computing devices, there are often multiple hierarchies associated with the event data, e.g., time, configuration, workload, event type. In particular, the illustrative technique employs the generalization-specialization algorithm described by T. M. Mitchell in "Machine Learning," which itself uses abstraction hierarchies in two ways. First, when a positive example is encountered that is not covered by the current set of predicates, the level of one or more abstraction hierarchies is increased to include this example. By positive examples, it is meant a grouping of events that are an instance of the situation being characterized. That is, a positive example may be a pattern of events that is indicative of an abnormality of interest. Second, when a negative example is encountered that is covered by the predicate, the level of one or more abstraction hierarchies is decreased. A negative example is a mistaken identification, i.e., events that are not an instance of the situation being characterized. That is, a negative example may be a pattern that is wrongly selected by the system as being another positive example. Various schemes may be used to optimize that hierarchy level chosen to maximize the number of positive examples covered and minimize the number of negative examples covered. Where and how this learning algorithm is used in accordance with the illustrative rule construction technique is described in the context of FIG. 5.

Thus, given the detected and classified pattern, in steps 505 through 520, the event management decision support system executes a machine learning algorithm to learn the LHS of the rule being constructed. Specifically, in step 505, the system learns a concept using positive and negative examples associated with the detected and classified pattern. Positive examples may be offered by the analyst or the machine. But, if offered by the machine, the positive examples should be confirmed by the analyst. Negative examples may also be labeled as such by the analyst. In step 510, the system determines if there are a sufficient number of examples to learn the LHS of the rule. If there are, the flow proceeds to step 420, i.e., add the RHS of the rule and evaluate the result. If there is not, in step 520, the machine looks for similar patterns based on the rule constructed so far. That is, the machine performs a similarity query based on the positive and negative examples. In step 530, the analyst critiques the result by determining if the examples to date accurately reflect the concept to be identified. For example, this may involve: (a) reclassifying a positive example as a negative example or a negative example as a positive example; (b) deleting examples; and (c) including or excluding events in an example so that it better conforms with the concept being learned. Then, in step 540, the analyst may optionally adjust the parameters of the learning mechanism to better operate with the concept being learned. The methodology flow then returns to step 505 where the learning algorithm is again performed followed by a check (step 510) on whether there is sufficient confidence in the concept learned. This process may iterate any number of times until a particular confidence level is attained and the rule LHS is determined.

Examples of learning mechanism parameters that may be adjusted relate to the way in which learning is done. One technique, involving nearest neighbors, employs a distance function that relates known examples to unknown ones. Parameters here specify: (a) how distances are computed (e.g., absolute value, Euclidean distance); (b) how components of distance are weighted if multiple attributes are involved (e.g., weight similarity in the host more than in the event type); and (c) thresholds for how distant is too far to be similar.

To elaborate on step 520, consider the preliminary concept "there is a port-down event followed by a port-up event from the same host within 5 seconds." A "host" may be any one of the computing devices illustrated in the network of FIG. 1. The event management decision support system seeks other examples of such an event sequence from a single host. One way this can be done is for the system to do a SQL query that retrieves all event interface-down events. Then for each, the system also retrieves the events that occurred over the next five seconds from that same host. The system then checks if one of these events is an interface-up. For those hosts that this is the case, the system then reports the entire sequence of events from interface-down through interface-up.

Thus, at the end of the illustrative rule construction process with respect to such an example, a correlation rule may be constructed with a LHS that states: "When there is a port-down event followed by a port-up event from the same host within 5 seconds," and a RHS that states: "delete the events." That is, it may be that this is a normal pattern and so the corresponding events should be filtered or ignored by the event management system during real-time activities.

Figure 6:
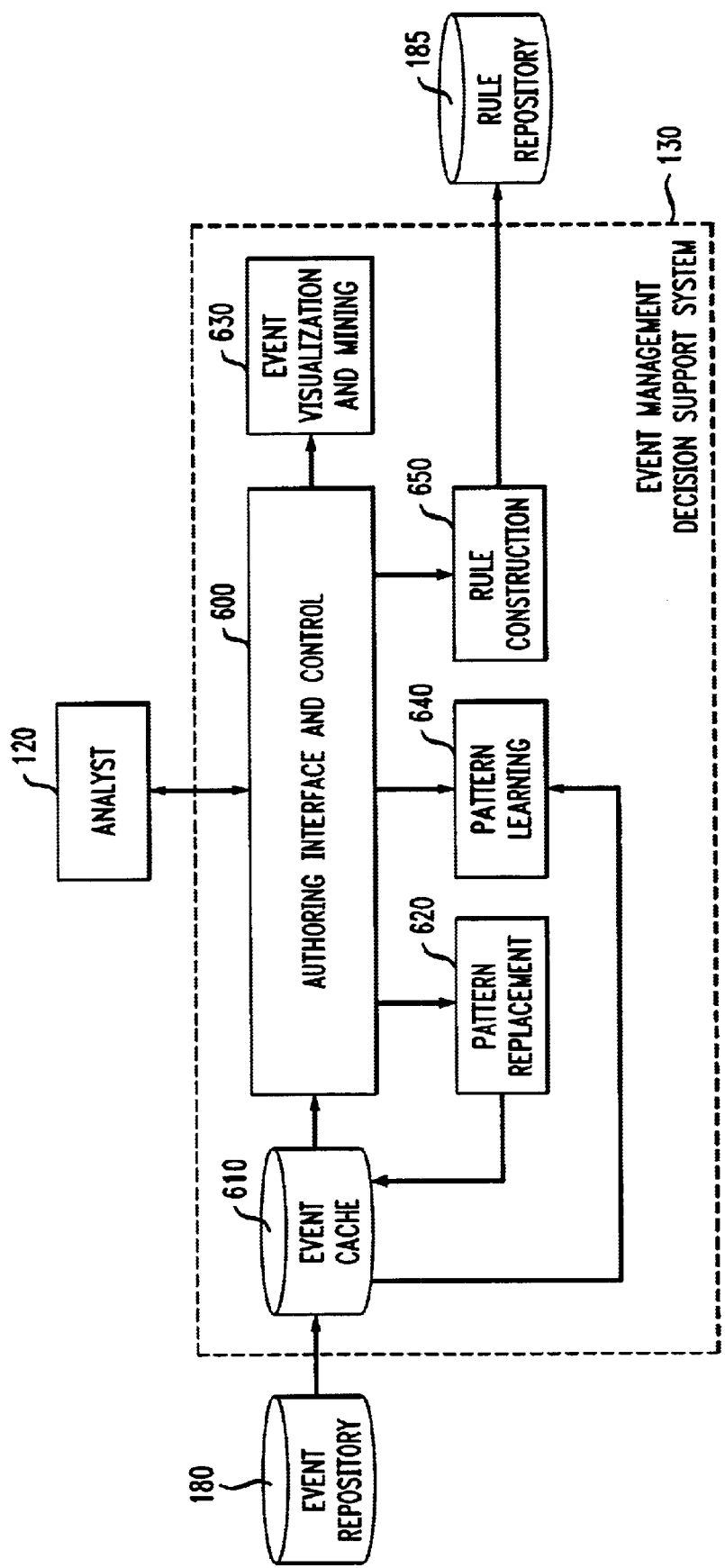
FIG. 6 is a block diagram illustrating a systematic rule construction system according to an embodiment of the present invention.

Referring now to FIG. 6, a block diagram illustrates a systematic rule construction system according to an embodiment of the present invention. Specifically, FIG. 6 depicts components of an illustrative event management decision support system 130 (FIG. 1). As shown, the decision support system comprises an authoring interface and control module 600, an event cache 610, a pattern replacement module 620, an event visualization and mining module 630, a pattern learning module 640 and a rule constructor module 650.

The authoring interface and control module 600 provides overall control of the interactions with the analyst 120 (FIG. 1) and the flow within the event management decision support system. That is, the authoring interface and control module 600 controls the operations of the steps in FIGS. 3, 4 and 5.

The event cache 610 is the event cache whose data is processed in accordance with the invention, as described above. The event cache is initialized to contain a copy of the event repository (Event DB) 180, or some desired portion thereof. It is to be appreciated that the copy of the event repository need not be an actual copy of the event data, but may alternatively comprise pointers into the event repository. The event cache is updated as the methodology of the invention proceeds, as illustrated and described above in the context of FIG. 3.

The pattern replacement module 620 replaces patterns in the event cache with one or more other events, e.g., composite events, as explained above in accordance with step 310 of FIG. 3.

The event visualization and mining module 630 uses techniques such as, for example, those mentioned in the above-referenced U.S. patent application identified by Ser. No. 09/359,874 and entitled "System and Method for Exploratory Analysis of Data for Event Management," and the above-referenced U.S. Pat. No. 5,874,955 issued to Rogowitz et al. and entitled "Interactive Rule Based System with Selection Feedback that Parameterizes Rules to Constrain Choices for Multiple Operations," to provide visualizations of the historical event data to the user and to the decision support system. Such visualizations are used to find patterns in the event data of the event cache, as explained above in accordance with step 304 of FIG. 3.

The pattern learner 640 is invoked to perform step 410, shown in FIG. 4 and described in detail in the context of FIG. 5. That is, the pattern learner performs a process for query-based learning of a rule left-hand side.

The rule constructor 650 is used to perform step 420 in FIG. 4 in combination with the analyst 120, i.e., adding the rule right-hand side and evaluating the constructed rule. The rule constructor is also operable to read from and write to the rule repository (Rule DB) 185. For example, after a rule is constructed, the rule constructor writes the rule to the rule repository for subsequent use by the event management execution system.

Figure 7:
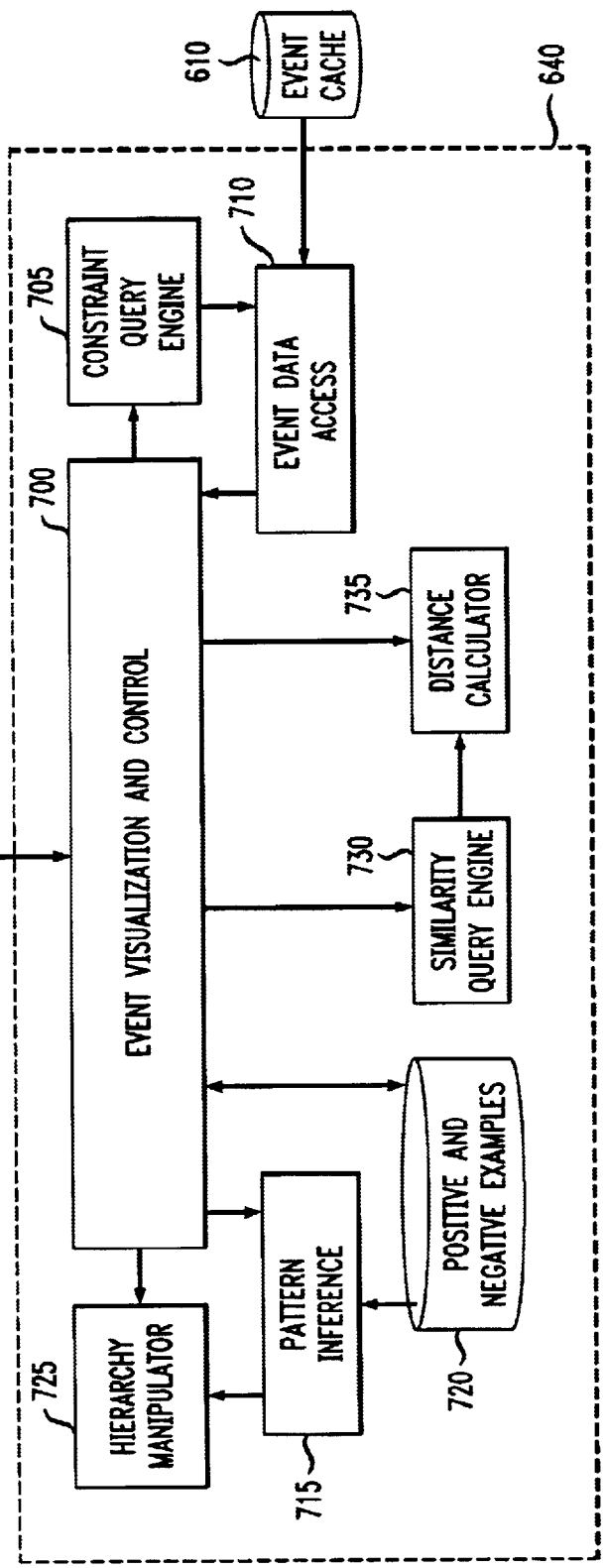
FIG. 7 is a block diagram illustrating a pattern learning system for use in accordance with an embodiment of the present invention.

Referring now to FIG. 7, a block diagram illustrates a pattern learning system according to an embodiment of the present invention. Specifically, FIG. 7 details elements of the pattern learning module 640 of FIG. 6. As shown, the pattern learner comprises an event visualization and control module 700, a constraint query engine 705, an event access module 710, a pattern inference module 715, a positive and negative examples repository 720, a hierarchy manipulator module 725, a similarity query engine 730 and a distance calculator module 735.

The event visualization and control component 700 controls interactions with the analyst for purposes of learning event patterns. The event visualization and control component 700 also controls the flow within the pattern learner, including queries to the event cache 610 via the constraint query engine 705, which in turn invokes the event data access component 710 to read event data from the event cache. In addition, the event visualization and control component 700 invokes the pattern inference component 715 to determine possible patterns in the set of positive and negative examples stored in repository 720, and establishes abstraction hierarchies, as explained above, used by the hierarchy manipulator 725 that is employed by the pattern inference module 715. The event visualization and control module 700 also updates the set of positive and negative examples in repository 720 and invokes the similarity query engine 730 to aid in finding other positive and negative examples. Doing so requires specifying numerical distances between patterns, which module 700 specifies through interactions with the distance calculator 735, a component that is invoked by the similarity query engine.

It is to be noted that the above-described event management decision support system of the invention may also be used to construct one or more correlation rules where no historical data exists. This happens, for example, to cover very rare (but extremely costly) fault scenarios, such as power failures or problems with excessive heat due to a fan failure. In such a case, by way of example only, the analyst may just input the correlation rule that specifies an action to remedy such a fault scenario.

Figure 8:
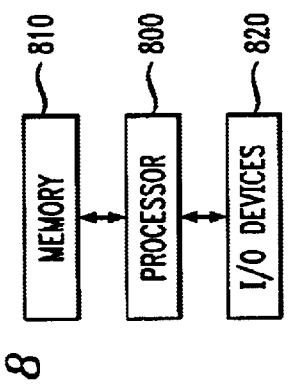
FIG. 8 is a block diagram illustrating a generalized hardware architecture of a computer system suitable for implementing a systematic rule construction system for use in event management according to the present invention.

Referring now to FIG. 8, a block diagram is shown illustrating a generalized hardware architecture of a computer system suitable for implementing the various functional components/modules of an event management decision support system 130 as depicted in the figures and explained in detail herein. It is to be understood that the individual components of the event management decision support system may be implemented on one such computer system, or on more than one separate such computer system. Also, individual components of the system may be implemented on separate such computer systems. It is also to be appreciated that the event management execution system 110, Event DB 180 and Rule DB 185 may be implemented on one or more such computer systems.

As shown, the computer system may be implemented in accordance with a processor 800, a memory 810 and I/O devices 820. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. Memory 810 may also comprise the event cache. In addition, the term "input/output devices" or "I/O devices" as used herein is intended to include, for example, one or more input devices (e.g., keyboard, mouse, etc.) for entering data to the processing unit, and/or one or more output devices (e.g., CRT display, printer, etc.) for presenting results associated with the processing unit. For example, user interfaces of the system employed by an analyst may be realized through such I/O devices. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) as an article of manufacture and, when ready to be utilized, loaded in part or in whole (e.g., into RAM) and executed by a CPU.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A computer-based method of systematically constructing one or more correlation rules for use by an event management system for managing a network with one or more computing devices, the method comprising the steps of:

obtaining, in association with an event cache, event data representing past events associated with the network of computing devices being managed by the event management system;

finding at least one pattern in the obtained event data associated with the event cache, the at least one pattern including one or more events in the obtained event data;

classifying the at least one pattern found;

constructing at least one correlation rule based on the classified pattern; and replacing, in association with the event cache, the one or more events included in the at least one pattern with a composite event such that hierarchical patterns may be subsequently found for use in constructing further correlation rules.

2. The method of claim 1, further comprising the step of storing the at least one correlation rule in a rule database for access by the event management system.

3. The method of claim 1, wherein the finding, classifying, constructing and replacing steps are repeated until all the event data associated with the event cache is considered.

4. The method of claim 1, wherein the classifying step further comprises classifying the at least one pattern as one of normal and abnormal.

5. The method of claim 1, wherein the at least one correlation rule constructing step further comprises the steps of:

automatically learning at least one predicate of the at least one correlation rule from the at least one pattern found; and adding at least one corresponding action to the at least one automatically learned predicate, based on the classifying step, to form the at least one correlation rule.

6. The method of claim 5, wherein the automatic learning step further comprises using at least one of a positive example and a negative example of the one or more events included in the at least one pattern.

7. The method of claim 1, wherein the step of finding at least one pattern further comprises a user marking the at least one event pattern in accordance with a data visualization of at least a portion of the event data associated with the event cache.

8. The method of claim 1, wherein the step of finding at least one pattern further comprises employing a data mining algorithm.

9. Apparatus for systematically constructing one or more correlation rules for use by an event management system for managing a network with one or more computing devices, the apparatus comprising:

at least one processor operative to: (i) obtain, in association with an event cache, event data representing past events associated with the network of computing devices being managed by the event management system; (ii) find at least one pattern in the obtained event data associated with the event cache, the at least one pattern including one or more events in the obtained event data; (iii) classify the at least one pattern found; (iv) construct at least one correlation rule based on the classified pattern; and (v) replace, in association with the event cache, the one or more events included in the at least one pattern with a composite event such that hierarchical patterns may be subsequently found for use in constructing further correlation rules.

10. The apparatus of claim 9, wherein the at least one processor is further operative to store the at least one correlation rule in a rule database for access by the event management system.

11. The apparatus of claim 9, wherein the finding, classifying, constructing and replacing operations are repeated until all the event data associated with the event cache is considered.

12. The apparatus of claim 9, wherein the classifying operation further comprises classifying the at least one pattern as one of normal and abnormal.

13. The apparatus of claim 9, wherein the at least one correlation rule constructing operation further comprises: (i) automatically learning at least one predicate of the at least one correlation rule from the at least one pattern found; and (ii) adding at least one corresponding action to the at least one automatically learned predicate, based on the classifying step, to form the at least one correlation rule.

14. The apparatus of claim 13, wherein the automatic learning operation further comprises using at least one of a positive example and a negative example of the one or more events included in the at least one pattern.

15. The apparatus of claim 9, wherein the operation of finding at least one pattern further comprises a user marking the at least one event pattern in accordance with a data visualization of at least a portion of the event data associated with the event cache.

16. The apparatus of claim 9, wherein the operation of finding at least one pattern further comprises employing a data mining algorithm.

17. An article of manufacture for systematically constructing one or more correlation rules for use by an event management system for managing a network with one or more computing devices, the article comprising a machine readable medium containing one or more programs which when executed implement the steps of:

obtaining, in association with an event cache, event data representing past events associated with the network of computing devices being managed by the event management system;

finding at least one pattern in the obtained event data associated with the event cache, the at least one pattern including one or more events in the obtained event data;

classifying the at least one pattern found;

constructing at least one correlation rule based on the classified pattern; and replacing, in association with the event cache, the one or more events included in the at least one pattern with a composite event such that hierarchical patterns may be subsequently found for use in constructing further correlation rules.

18. Apparatus for systematically constructing one or more correlation rules for use by an event management system for managing a network with one or more computing devices, the apparatus comprising:

means for obtaining, in association with an event cache, event data representing past events associated with the network of computing devices being managed by the event management system;

means for finding at least one pattern in the obtained event data associated with the event cache, the at least one pattern including one or more events in the obtained event data;

means for classifying the at least one pattern found;

means for constructing at least one correlation rule based on the classified pattern; and means for replacing, in association with the event cache, the one or more events included in the at least one pattern with a composite event such that hierarchical patterns may be subsequently found for use in constructing further correlation rules.

19. The apparatus of claim 18, further comprising means for storing the at least one correlation rule in a rule database for access by the event management system.

20. The apparatus of claim 18, wherein the finding, classifying, constructing and replacing means repeat their respective operations until all the event data associated with the event cache is considered.

* * * * *